United States Patent [19]

Itani et al.

[11] Patent Number: 5,834,584
[45] Date of Patent: *Nov. 10, 1998

[54] SILICONE RUBBER ROLLER FOR ELECTROPHOTOGRAPHY AND METHOD OF PRODUCING THE SAME

[75] Inventors: Hitoshi Itani; Yuji Yamasaki; Hirotoshi Murakami, all of Hyogo-ken, Japan

[73] Assignee: Sumitomo Rubber Industries Ltd., Hyogo-ken, Japan

[*] Notice: The term of this patent shall not extend beyond the expiration date of Pat. No. 5,443,873.

[21] Appl. No.: 427,087

[22] Filed: Apr. 25, 1995

Related U.S. Application Data

[63] Continuation-in-part of Ser. No. 974,059, Nov. 12, 1992, Pat. No. 5,443,873, Ser. No. 177,377, Jan. 5, 1994, abandoned, and Ser. No. 56,461, May 4, 1993, abandoned.

[30] Foreign Application Priority Data

Nov. 12, 1991 [JP] Japan .................................. 3-295399
May 14, 1992 [JP] Japan .................................. 4-122231

[51] Int. Cl.$^6$ .............................. B29C 71/00; B29B 15/00
[52] U.S. Cl. ........................... 528/501; 524/588; 264/51; 264/101; 264/232; 264/233; 264/234; 264/236
[58] Field of Search ........................... 528/34, 501, 901; 428/323, 331, 447, 448, 450, 36.5, 36.8, 36.9; 492/53, 56, 59; 252/511; 524/588, 847, 492, 495; 355/219, 271, 274, 275, 279, 285; 399/333, 339; 264/51, 101, 232, 233, 234, 236

[56] References Cited

U.S. PATENT DOCUMENTS

| | | | |
|---|---|---|---|
| 3,848,305 | 11/1974 | Jacimiak . | |
| 4,188,423 | 2/1980 | Swift | 427/444 |
| 4,356,116 | 10/1982 | Beers | 524/837 |
| 4,360,566 | 11/1982 | Shimizu et al. | 428/404 |
| 4,807,341 | 2/1989 | Nielsen et al. | 291/323 |
| 4,827,868 | 5/1989 | Tarumi et al. | 118/653 |
| 4,933,432 | 6/1990 | Yokoyama et al. | 528/498 |
| 4,956,211 | 9/1990 | Saito . | |
| 4,971,844 | 11/1990 | Schoustra et al. | 428/34.1 |
| 5,140,371 | 8/1992 | Ishihara et al. | 355/219 |
| 5,179,148 | 1/1993 | Inoue et al. | 524/275 |
| 5,210,126 | 5/1993 | Ushio et al. | 524/588 |
| 5,363,176 | 11/1994 | Ishihara et al. | 355/219 |
| 5,449,714 | 9/1995 | Inoue et al. | 524/495 |
| 5,449,735 | 9/1995 | Inoue et al. | 528/22 |
| 5,458,937 | 10/1995 | Nakamura et al. | 428/36.91 |
| 5,468,830 | 11/1995 | Inoue et al. | 528/26 |
| 5,550,185 | 8/1996 | Inoue et al. | 524/847 |
| 5,582,885 | 12/1996 | Nakamura et al. | 428/35.8 |

OTHER PUBLICATIONS

Patent Abstracts of Japan, vol. 10, No. 190 (P–474), Jul. 4, 1986 & JP–A–61 036 777 (Ricoh) Feb. 21, 1986.

*Primary Examiner*—Marie Yamnitzky
*Attorney, Agent, or Firm*—Nikaido Marmelstein Murray & Oram, LLP.

[57] ABSTRACT

An electrically conductive rubber roller for electrophotography which does not exhibit touch memory or bleed out of remnant siloxanes, even after 18 days of storage without use, and, in a preferred form, exhibits little change in electric resistance with changes in environment. This roller is made by making a rubber molding material composition containing a raw polysiloxane rubber which does not contain more than 5,000 ppm of low molecular weight polysiloxanes, cyclic siloxanes and non-functional silicone oils (remnant siloxanes); molding this composition into a roller; at least primarily crosslinking the rubber in the roller; and then subjecting the crosslinked rubber roller to heating under a vacuum.

6 Claims, 7 Drawing Sheets

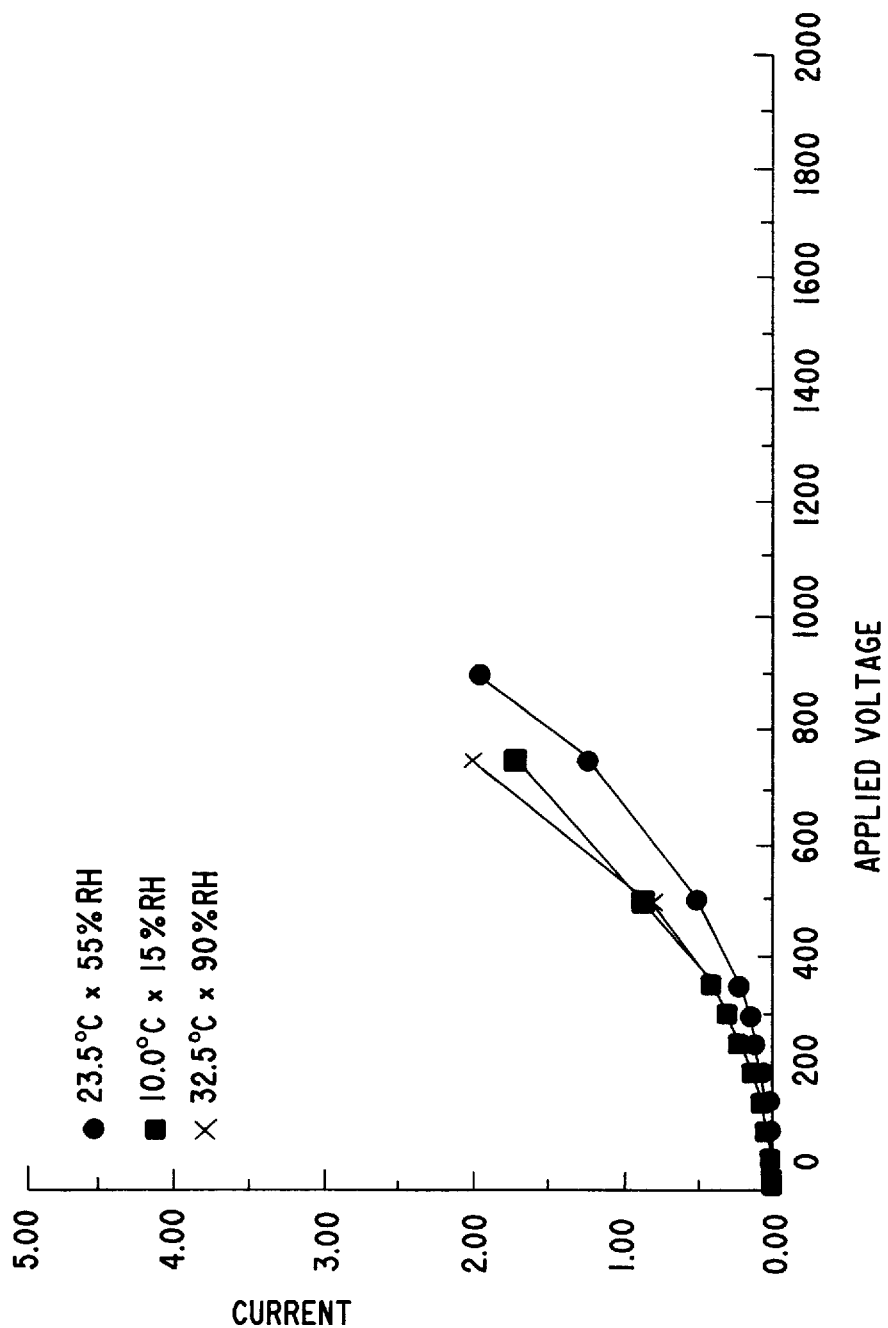

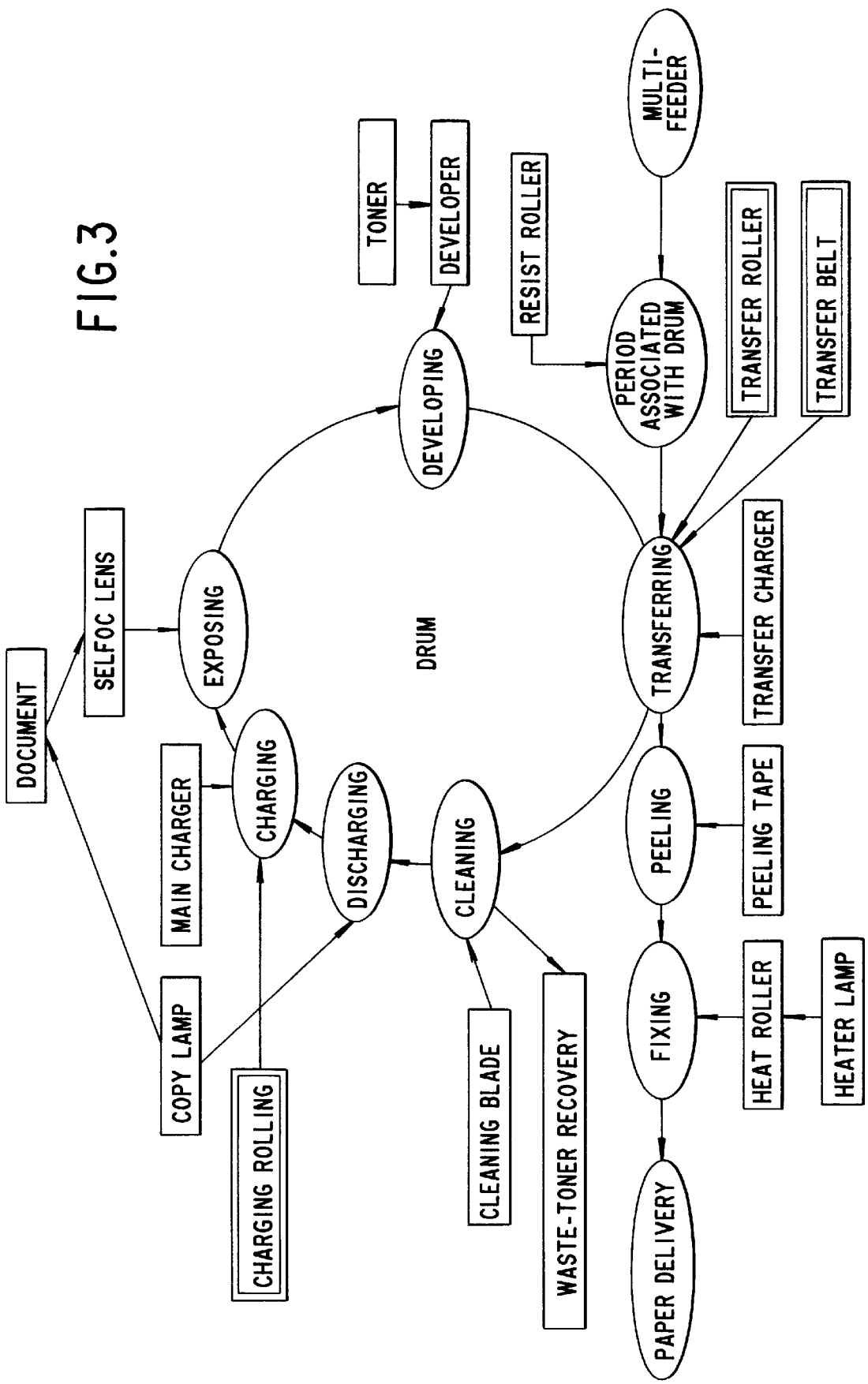

SILICONE RUBBER ROLLER FOR ELECTROPHOTOGRAPHY AND METHOD OF PRODUCING THE SAME

This is a continuation in part of application Ser. No. 07/974,059, filed Nov. 12, 1992, now U.S. Pat. No. 5,443,873; application Ser. No. 08/177,377, filed Jan. 5, 1994, now abandoned; and application Ser. No. 08/056,461, filed May 4, 1993, now abandoned. The entirety of each of these three parent applications is incorporated herein by reference.

BACKGROUND OF THE INVENTION

The present invention relates to an electrically conductive rubber roller utilized as a charging means for copying machines, laser beam printers and the like.

In electrophotographic recording, which is widely used in copying machines, laser printers and the like, recording is effected through a series of processes such as: charging, exposure, development, image transfer, discharging and cleaning, as illustrated in FIG. 3. In addition, FIG. 4 shows an example of an electrophotographic recording device. The numeral 1 denotes an original table glass; 2 denotes a copy lamp; 3 denotes a selfoc lens; 4 denotes a photoreceptor; 5 denotes a charging roller; 6 denotes an image transfer roller; 7 denotes a developing roller; 8 denotes a paper feed roller; 9 denotes a pad; 10 and 11 denote resist rollers; 12 denotes a developing cartridge; 13 denotes a toner seal; 14 denotes a cleaning blade; and 15 denotes a waste toner box.

For the charging process, wide use has heretofore been made of a corona charging method in which a wire, called a corona charger, is subjected to a high voltage. This corona charging method has the following problems: as corona charging proceeds, the photoreceptor and other parts of the apparatus become deteriorated by being attacked by active molecules, such as ozone. These active molecules are also said to be harmful to the human body. Further, this method requires a high voltage source of thousands of volts, causing potential danger due to its high voltage. Further, the maintenance aspect of this apparatus is fraught with the problems of wire contamination and wire breakage.

Thus, recently, instead of the corona charging method, which is fraught with problems as described above, practical use has been made of a contact charging method using an electrically conductive rubber roller. In this contact charging method using an electrically conductive rubber roller, the electrically conductive rubber roller is externally impressed with voltage and is then contacted with a photoreceptor surface, whereby an electric charge is directly injected into the photoreceptor surface to charge the latter to a predetermined potential.

The above-mentioned contact charging method is also applied to the image transfer process. That is, a toner image formed on the photoreceptor surface is transferred onto the transfer paper sheet surface by applying a voltage of a few kilovolts to the electrically conductive rubber roller which is contacted with the transfer paper sheet surface, so as to form an electrostatic field on the transfer paper sheet surface, whereby the toner image formed on the photoreceptor surface is transferred to the transfer paper sheet surface.

Electrophotography using an electrically conductive roller comprising a conductive polysiloxane polymer has a problem. Rubber rollers used in the contact charging method are required to have environmental change-resisting stability, ozone resistance and heat-resisting stability.

A roller made of a conductive silicone rubber provides superior image quality immediately after the beginning of its use, but long-term use of the roller, or use thereof after storage for long periods of time, results in tracks of the roller appearing in printed out images. This phenomenon, so called touch memory, gradually deteriorates the image quality.

It is believed that this problem is caused by the presence in the roller of cyclic siloxanes of relatively low polymerization degree, such as those which are expressed by the formula:

$\{(CH_3)_2SiO\}n$ 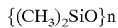

(where n is about 3∝30), or non-functional silicone oils such as for example: dimethyl silicone oil, methylphenyl silicone oil, methylhydrogen silicone oil, or other non-functional silicone oils. These low polymerization degree or low molecular weight polysiloxane, cyclic siloxanes and non-functional silicone oils bleed to and then out of the surface of the roller with time, either time in storage or time in use, but more detrimentally time in storage, and then transfer from the roller surface to the photoreceptor.

That is, the low polymerization degree (low molecular weight) polysiloxanes and non-functional silicone oils, which transfer to the photoreceptor, denature the insulating photoconductors forming the photoreceptor and deteriorate their functions. Moreover, since these substances are superior in water repelling and insulating properties, their mere presence itself obstructs the functions of the photoreceptor. And if the silicone rubber roller is held in contact with the photoreceptor for a relatively long time (for example, during downtime of the apparatus), these substances locally contaminate the photoreceptor, causing roller tracks (touch memory) to appear in the image. Further, since the silicone rubber roller is used over a long period of time, the whole of the photoreceptor is contaminated by these substances, with the result that the image quality markedly deteriorates with time.

This bleeding out of low polymerization degree (low molecular weight) polysiloxanes, cyclic siloxanes, and non-functional silicone oils is generally known in the art. Some of the commercially available silicone rubber compounds (rubber compounds which use a silicone raw rubber as a base polymer with a reinforcing filler and the like added thereto) have been pretreated in such a way that these detrimental substances are removed from the compositions, at least to some extent. One known means of removing these detrimental materials, which may be referred to herein as remnant siloxanes, is by forcibly absorbing them, such as by extraction in a suitable solvent. In the case of ordinary uses such as touch panels, using rollers made out of these pretreated grades of silicone rubber solve the problem of bleeding, but in the case of a roller for electrophotography, the removal of remnant siloxanes which is provided by such pretreatment, even in commercially available grades of silicone rubber, is not sufficient. The photoreceptors are contaminated anyway due to the presence of even trace amounts of low polymerization degree polysiloxanes, cyclic siloxanes, and non-functional silicone oils (collectively referred to as remnant siloxanes).

Silicone rubbers are conventionally crosslinked as part of their formation into a desired rubber shape. It is known that these remnant siloxanes are removed to some extent by the heating which is used during crosslinking. For example, in the case of a millable silicone(polysiloxane) rubber material, secondary crosslinking which is accomplished by heating the rubber composition for about 2 to 5 hours removes remnant siloxanes (low molecular weight, low polymerization degree siloxanes). However, the effect of this heating during crosslinking has still been found to be insufficient to remove a sufficient amount of these remnant siloxanes. This is particularly true of the removal of those low polymerization degree polysiloxanes which have a relatively high (but still below 30 mer units) degree of polymerization. It has also been found that the higher molecular weight non-functional silicone oils can hardly be removed by heating at atmospheric pressure sufficient to accomplish secondary crosslinking. That is, heating, at ordinary pressure, of the preformed silicone rubber roller to the extent necessary to carry out the secondary crosslinking thereof has not been found to be capable of preventing the contamination of the photoreceptor during electrophotography.

Although it is known that remnant siloxanes (low polymerization degree polysiloxanes, cyclic siloxanes, and non-functional silicone oils) can be removed by an extraction treatment using a solvent, its effect is both slow and very low. If it is desired to achieve a sufficient degree of removal by an extraction treatment alone, a very long period of time is required to carry out the extraction. This makes it an unsuitable method for practical use from the standpoint of productivity.

SUMMARY OF THE INVENTION

Accordingly, the present invention has been accomplished with the above in mind and it is an object of the invention to provide an electrically conductive rubber roller for electrophotography which is not subject to causing touch memory during its use or after it has been stored, even for long periods of time.

It is a further object of this invention to make such a rubber roller for electrophotography which, in addition to not causing touch memory during use in electrophotography, also has a very stable resistivity regardless of the temperature and humidity conditions under which it is stored and used.

To achieve the principal object of this invention, a silicone rubber roller for electrophotography is provided which comprises a porous body comprising a crosslinked silicone rubber composition which has been treated in the manner to be described below such that, even after storage for up to about 18 days, its use does not cause bleed out of remnant siloxanes on a third copy sheet of paper.

Thus the present invention has been accomplished with the above in mind and a silicone rubber roller has been developed wherein even trace amounts of low polymerization degree siloxanes, cyclic siloxanes, and non-functional silicone oils (which are sometimes referred to herein collectively as remnant siloxanes) have been substantially completely removed and therefore there is little or no possibility of contamination of the photoreceptor used in electrophotography upon contact with such roller, not only after long term storage of the roller, but also immediately after the beginning of use as well as during and after a long period of use. This invention also resides in a method of producing such a roller.

To solve the problems presented by the presence of the remnant siloxanes, we have studied various treating methods and found that when a crosslinked silicone rubber which has already been molded into the form of a roller for electrophotography is heated in a vacuum, the troublesome remnant siloxanes, even the low polymerization degree (low molecular weight) polysiloxanes having relatively high polymerization degrees approaching 30 mer units, cyclic siloxanes and non-functional silicone oils, are efficiently removed from the rubber composition, though the reason is not clear. Our further study has led to the finding that when a silicone rubber type compound, of the available commercial grade in which low polymerization degree polysiloxanes, cyclic siloxanes, and non-functional silicone oils have been pre-removed, even down to levels as low as 5,000 ppm and even lower, prior to being formed into the rubber roller of this invention, is molded and then heated in a vacuum, the remnant siloxanes (low polymerization degree polysiloxanes, cyclic siloxanes, and non-functional silicone oils, even higher molecular weight non-functional silicone oils) are substantially completely removed. In that case, a silicone rubber roller for electrophotography is produced which has substantially no danger of contaminating the photoreceptor not only after long storage or immediately after the beginning of use, but also after a long time of use.

In one embodiment of this invention, there is provided a silicone rubber roller for electrophotography which has been made by:

molding a composition comprising a rubber compound, having a raw silicone rubber as a base polymer, in which the sum of the concentrations of the low polymerization degree polysiloxanes, cyclic siloxanes, and non-functional silicone oils contained in said composition is not more than 5,000 ppm, into the shape of a roller for electrophotography;

cross linking (at least primarily cross linking) the polysiloxanes rubber in a roller form; and then heating said at least primarily cross linked silicone rubber roller under a vacuum subsequent to molding and cross linking for a time and under conditions sufficient to substantially completely remove the remnant siloxanes from the roller.

BRIEF DESCRIPTION OF DRAWINGS

FIG. 1 is a graph showing the relation between impressed voltage and current in an electrically conductive rubber roller for electrophotography according to the present invention in high temperature, high humidity, ordinary temperature, ordinary humidity, and low temperature and low humidity environments;

FIG. 3 is a diagram of a process of carrying out electrophotography;

DESCRIPTION OF THE PREFERRED EMBODIMENTS

Figure 2A:
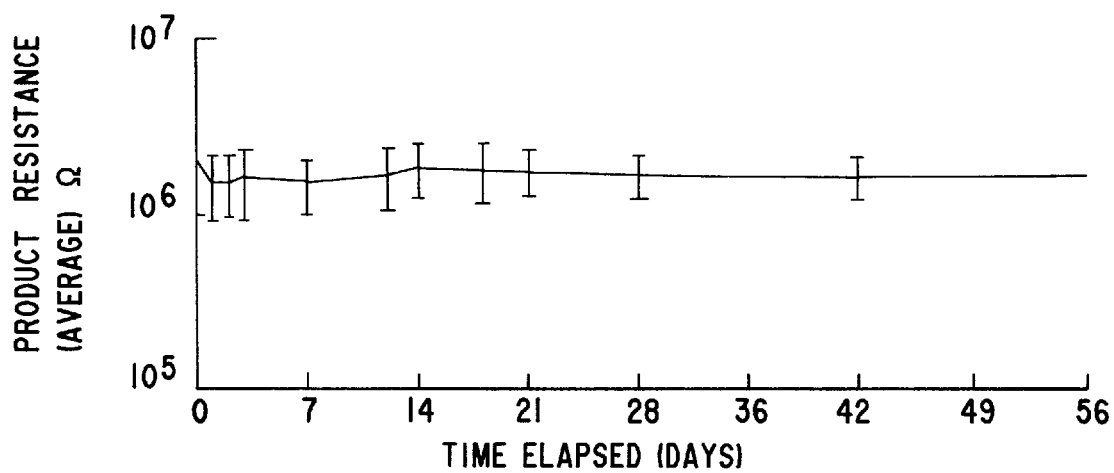
FIG. 2 is a graph showing time-dependent changes in the electric resistance, hardness, width and outer diameter of the electrically conductive rubber roller for electrophotography according to the present invention.
Figure 2B:
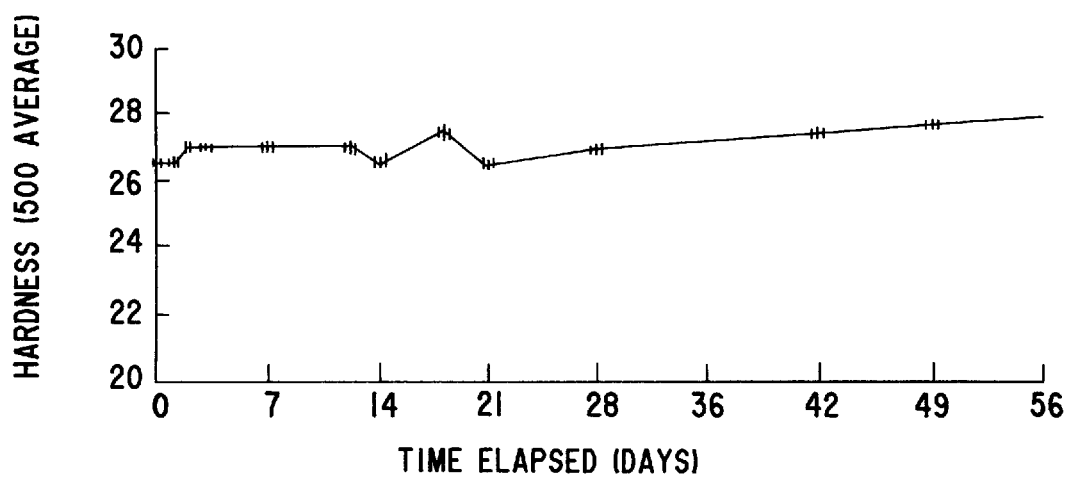
Figure 2C:
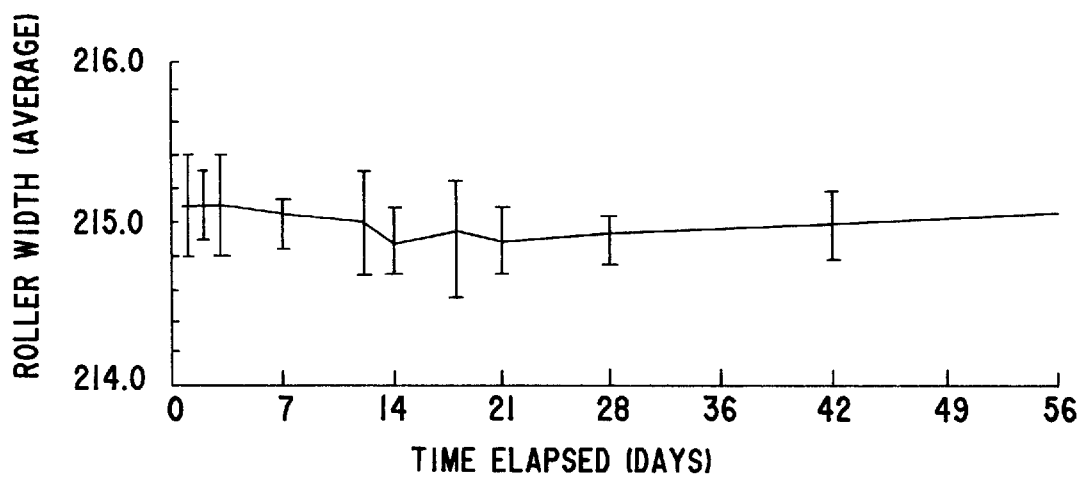
Figure 2D:
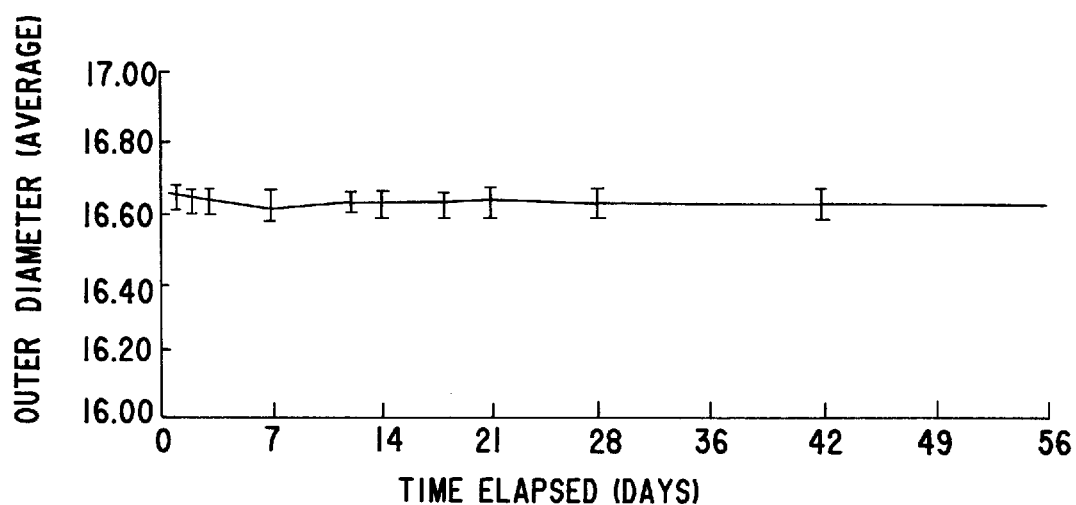
Figure 4:
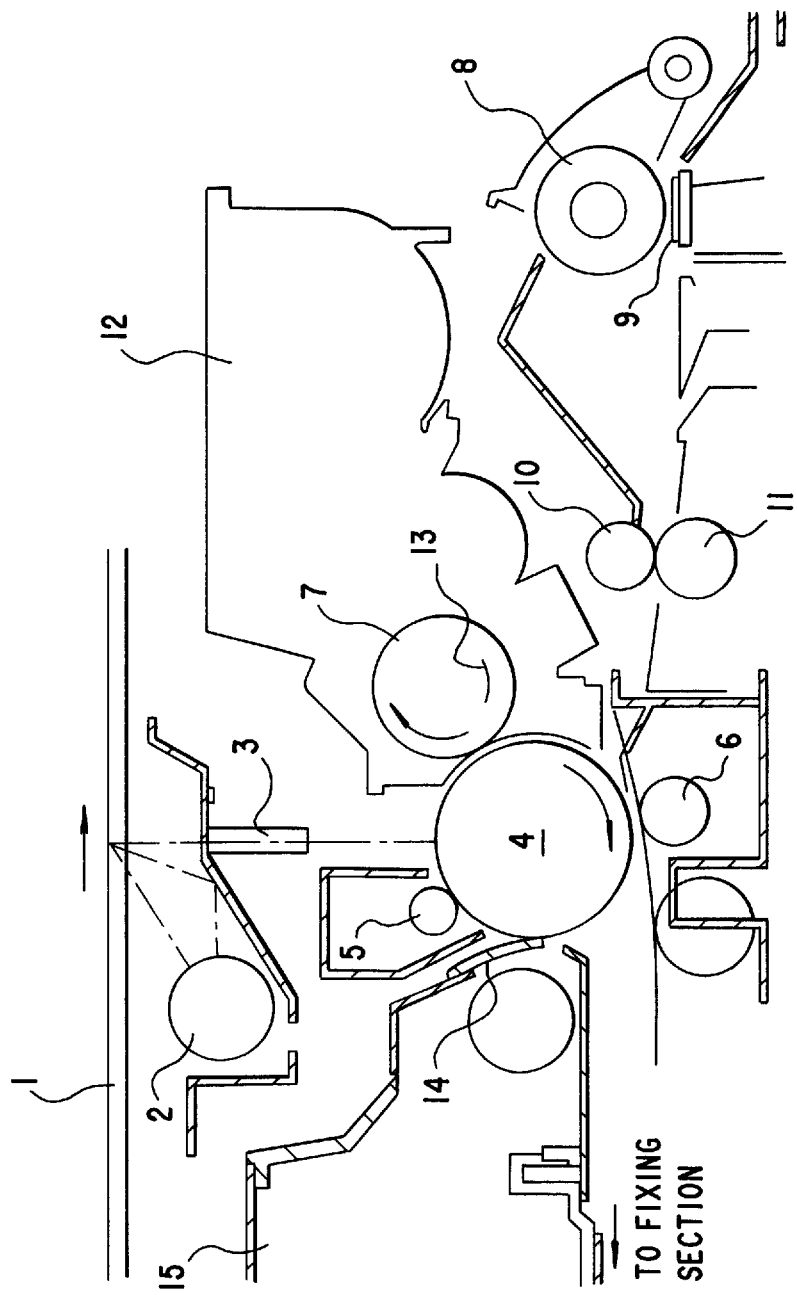
FIG. 4 is an example of an electrophotographic recording system.

The silicone rubber molding material composition used in the present invention may be liquid or millable, but a millable molding material which can be kneaded in the same process as is used for processing conventional rubber material is particularly suitable for use in this invention. A millable molding material is prepared by adding various additives to the base raw rubber, including: crosslinking agent, catalyst, non-reinforcing (bulking) filler, and electrical resistance control agent. The base raw rubber material is exemplified by, but not limited to, a commercially available silicone rubber compound which may have added thereto an unhydrated silica type reinforcing filler, such as aerosol, and a conductive carbon. The raw silicone rubber can suitably be a gel-like silicone raw rubber (linear organo polysiloxane polymer) having a polymerization degree of about 5,000 to 10,000. The rubber composition may be admixed by being melt-kneaded for example in a roll mill. Further, the silicone rubber roller for electrophotography according to the present invention is preferably in the form of soft sponge in order to provide an increased area of contact between the roller and the photoreceptor in order to stabilize the charging property. To this end, a foaming agent, which may foam by the action of the heat developed during primary or secondary crosslinking, may be added to the molding material composition. The amounts of these additives are the amounts which are conventionally used for their intended purposes.

As for the silicone raw rubber which is the base polymer, use may be made of various known types, such as dimethyl silicone type, methylvinyl silicone type, methylphenylvinyl silicone type and ferrosilicone type.

The sum of the concentrations of the low polymerization degree polysiloxanes, cyclic siloxanes, and non-functional silicone oils contained in the raw silicone type rubber composition prior to molding and crosslinking is constrained to be not more than about 5,000 ppm. If the sum of the concentrations of these remnant siloxane substances exceeds about 5,000 ppm, the excess does not appear to be capable of being completely removed by vacuum heating alone after molding and crosslinking. When the amount of these remnant siloxanes in the raw silicone rubber substantially exceeds 5,000 ppm, and the rubber roller is made as aforesaid, this roller does not have a problem of contamination of the photoreceptor if it is immediately put into service, however, the low polymerization degree (low molecular weight) polysiloxanes, cyclic siloxanes, and non-functional silicone oils which remain in the roller made from this high remnant siloxane raw rubber seem to gradually bleed to the surface and eventually contaminate the photoreceptor. Thus, the desirable effect of heating the crosslinked roller under a vacuum according to this invention is lost.

It should be understood that the raw silicone rubber may be commercially purchased with a limited amount of remnant siloxanes therein as aforesaid. It is also within the scope of this invention to start with raw silicone rubber which has an excess of these remnant siloxanes therein and to then treat this raw rubber to bring its content of remnant siloxanes down to within the acceptable maximum required by this invention prior to forming this rubber into the roller of this invention.

To adjust the sum of the concentrations of these adverse components contained in the raw silicone rubber compounds to not more than 5,000 ppm, mention may be made of a method in which the raw silicone rubber is vacuum-treated and the undesirable remnant siloxane components are forcibly sucked out of the raw rubber composition and therefore are removed. However, since there are some commercially available silicone rubber type compounds in which the sum of the concentrations of the adverse remnant siloxane components has already been adjusted within said required limit of 5,000 ppm, it is a preferred aspect of this invention to use such commercially available raw silicone rubber compositions from the standpoint of productivity and cost. Examples of some commercially available silicone rubber type compounds in which the sum of the concentrations of the remnant siloxane components has been pre-adjusted to within said range, include Product No. X-30-1807U (an electrically conductive silicone compound) and Product No. X-30-1807M (an electrically insulating silicone compound) both produced by the Shin-Etsu Chemical Co., Ltd.

For crosslinking agents, for example, organic peroxide type crosslinking agents may be used. Examples of such conventional organic peroxide type crosslinking agents, include benzoyl peroxide, bis-2, 4-dichlorobenzoyl peroxide, dicumyl peroxide, 2, 5-dimethyl-2, 5-bis-(tertbutyl peroxide) hexane, and tert-butylcumyl peroxide. Further, aliphatic azo compounds and sulfur can also be used as crosslinking agents.

For bulking fillers, mention may be made of inorganic fillers, such as reinforcing fillers, calcium carbonate, hard clay, barium sulfate, talc, mica, asbestos, and graphite; and organic fillers, such as regenerated rubber, powder rubber, asphalts, styrene resin, and glue.

To produce a rubber roller for electrophotography from a polysiloxane rubber molding material, the production method of the present invention is employed in which the rubber composition, suitably compounded with the other desirable ingredients, is molded into the desired roller shape, crosslinked in the roller form and shape, and then the crosslinked roller is subjected to further heating under a vacuum.

Molding and crosslinking the silicone rubber composition into a suitable roller form is accomplished in the same manner as in the prior art. For example, in the case of a millable silicone rubber molding material, the molding composition is primarily crosslinked concurrently at the same time as it is molded using such molding method as compression molding, injection molding or transfer molding, or it can be molded in roller form as by calender roll molding, extrusion molding and then primarily crosslinked by any of the known crosslinking methods, such as HAV (hot air vulcanization). In either case, the molded roller which has been primarily crosslinked is then secondarily crosslinked by the application of heat such as by using a hot air drier or the like. Further, in some cases, the vacuum heating to be described below may be wholly or partially substituted for the conventional secondary crosslinking by adding vacuum to the conventional heating needed to complete the secondary crosslinking.

In order to heat the molded, at least primarily crosslinked, roller under a vacuum, as is required by this invention, an otherwise conventional vacuum oven or the like can be used. Although the conditions for vacuum heating are not particularly restricted, preferable conditions include an ultimate vacuum of 5 mm Hg or lower, a heating temperature (furnace wall temperature) of about 150–250° C., and a heat treating time of about 3–25 hours. In the case where the ultimate vacuum is substantially higher than about 5 mm Hg, or the heating temperature is far below about 150° C., or the treating time is much shorter than about 3 hours, it has been found to be substantially impossible to thoroughly remove the remnant siloxanes to an extent sufficient for the purposes of this invention. If the heating temperature is far above 250° C. or the treating time is longer than about 25 hours, not only will this be a waste of energy, but also the roller may suffer from being denatured or deteriorated.

This vacuum heating according to the practice of this invention substantially completely removes the remnant siloxanes (low polymerization degree, low molecular weight, polysiloxanes, cyclic siloxanes, and non-functional silicone oils) whereby forming a crosslinked silicone rubber roller which is well suited to use in electrophotography and has substantially no danger of contaminating the photoreceptor.

In addition, the present invention contemplates that, before or after, but not instead of, said vacuum heating, the molded roller may be subjected to solvent extraction treatment for the purpose of even more completely removing remnant siloxanes. If this additional solvent extraction treatment is carried out, further quantities, over and above the amounts removed by heating under vacuum conditions, of remnant siloxanes, such as non-functional silicones of relatively high molecular weight and low polymerization degree polysiloxanes, can be reliably removed and the residual concentrations of these substances can therefore be further decreased.

As for solvents, use may be made of various solvents which can dissolve low polymerization degree siloxanes and non-functional silicones. Preferable solvents are acetone, hexane, ethyl acetate and toluene. In general, the solvents which are known in the art for this purpose are suited to use in this aspect of this invention.

The silicone rubber roller for electrophotography of the present invention produced by the above-described production method of the present invention has substantially no traces of the low polymerization degree siloxanes and non-functional silicone oils because they are substantially completely removed by the vacuum heating treatment. Thus, even if the roller is placed in contact with a photoreceptor surface, there is substantially no danger of contaminating the photoreceptor not only at the beginning of use but also after a long period of use, or even upon use after storage for as long as 18 days. Therefore, the silicone rubber roller for electrophotography according to the present invention can be employed in image forming apparatuses such as electrostatic copying machines and laser beam printers and used therein as a contact charging roller disposed in contact with a photoreceptor surface, such as a charging roller for uniformly charging the surface of a photoreceptor, a transfer roller for transferring toner images formed on the surface of the photoreceptor to a printing material such as paper, and a discharging roller for removing the residual charge on the photoreceptor surface.

In the case where the silicone rubber roller for electrophotography of the present invention is used as said contact charging roller, the resistance of its surface is preferably about $10^3$–$10^{10}$ $\Omega$,. If the surface resistance of the roller is less than $10^3$ $\Omega$, and the roller is used as a charging roller, it sometimes happens that the charge which has been applied to the photoreceptor is re-absorbed by the roller, making it impossible to impart a desired charge of predetermined magnitude to the photoreceptor. If the surface resistance exceeds $10^{10}$ $\Omega$, the voltage for charging the photoreceptor to a predetermined level increases, requiring a higher voltage source and hence increasing the size and potential danger of the apparatus.

To adjust the resistance of the surface of the silicone rubber roller for electrophotography within said range, it is within the scope of this invention to make the roller out of a combination of an electrically conductive type silicone rubber compound and an electrically insulating type silicone rubber compound, and suitably adjusting the mixing proportions thereof in order to adjust the surface resistance. It is also contemplated that there may be added to the rubber composition from which the roller is made, an appropriate proportion of a resistance adjusting agent, which is used as an additive. Such resistance adjusting additives are generally well known.

As described above, the silicone rubber roller for electrophotography of the present invention is preferably in the form of a foam or a sponge in order to increase the surface area thereof which comes into contact with the photoreceptor. The use of this foam or sponge form of roller has the ability to stabilize the charging property.

In addition, as noted above, the silicone rubber roller for electrophotography of the present invention, besides being used as a charging roller, can be used as a paper feed roller, or as a conveyor roller which does not contact the photoreceptor surface but which does contact other materials which in turn contact the photoreceptor surface. Thus, if remnant siloxanes bleed from the roller onto these other materials, they can be carried into contact with the photoreceptor and are therefore liable to contaminate the photoreceptor in the same manner as if the charge roller had been in direct contact.

Even with rollers made according to this invention which do not have any substantial problems with the bleeding out of remnant siloxanes upon long storage or use, such rollers have an additional problem.

References (1) Japanese Patent Application Disclosure No. 302777/1970.
(2) "Charging and Transfer Process", page 47, from the Electrophotography Society's 30th Training Course Text "From Fundamentals of Elements of Electrophotographic Technology to Recent Trends".
(3) "Contact Type Charging Technique Not Using Corona Charger", page 573, from Electrophotography Society's Journal, vol. 27. No. 4 (1988).

In said contact charging method, use has heretofore been made of a sponge roller, comprising EPDM (ethylene propylene rubber), which is used as an electrically conductive rubber roller whose resistance has been adjusted to about $10^7$–$10^{10}$ $\Omega$ by incorporating carbon black therein, which is a common means for imparting electric conductivity to otherwise non-conductive materials such as organic polymers.

However, it has been found that the resistance of such an electrically conductive rubber roller is subject to great variation and change depending on the environment in which it resides. Its resistance can be about $5\times10^7$–$10\times10^7$ if the roller is maintained under high temperature, high humidity conditions (e.g. 32° C.×85% RH). The resistance of the roller can be as high as about $10^9$ $\Omega$ in low temperature low humidity and low temperature (e.g. 15° C.×10% RH) environments (see published Japanese Patent Application Disclosure No. 302777/1970. It is believed that the reason for this wide swing in resistivities is that in high humidity environments, electrically conductive elastomer tends to absorb water and this improves its conductivity and lowers its electric resistance. With such an electrically conductive rubber roller, therefore, changes in electric resistance due to its environment are so large that the charge potential is not stable when the ambient environment changes. These changes in the charge potential can cause the quality of the image to vary and to become poor under some circumstances.

Actually, when printing was effected by a laser beam printer (Laser Shot Printer A-404, produced by Canon Inc.) by using said electrically conductive rubber roller, the following result was obtained which was believed to be due to changes in the electric resistance of the electrically conductive rubber roller:

(1) Faults in image quality appeared in the solid portion in high temperature high humidity and low temperature low humidity environments; and (2) When dry paper was printed, faults in image quality appeared in the solid portion.

Therefore, it is a further embodiment of this invention, to provide a rubber roller for electrophotography, which has been made according to this invention by compounding a suitable raw silicone rubber with suitable additives into a rubber composition comprising less than 5,000 ppm of remnant siloxanes, forming this composition into a roller form, crosslinking the silicone rubber in the roller form and shape, and then subjecting the crosslinked roller to heat under vacuum for a time and under a combination of conditions sufficient to remove further quantities of the remnant siloxanes so as to produce a roller which, even after 18 days of storage, will not exhibit any bleed out of these remnant siloxanes on a third sheet of copy paper, which is most preferably formed of a composition which comprises:

TABLE 1

| component | amount |
| --- | --- |
| Raw Siloxane polymer | 100 parts by weight |
| Silica type filler | 18–28 parts by weight |
| Carbon black | 5–12 parts by weight |
| Foaming agent, additives, vulcanizing agent, etc. (cumulatively) | 10–30 parts by weight |
| Remnant siloxanes | less than 5,000 ppm |

It has been found that, in addition to the ability of the roller for electrophotography made according to this invention not exhibiting substantially any bleed out, or producing any touch memory, it is also possible, by compounding the roller as aforesaid, to make a roller which has a more stable resistivity irrespective of the conditions of temperature and humidity under which the roller is stored and/or used. The resistance of the electrically conductive rubber roller for electrophotography made from raw silicone rubber, silica and carbon black in the general proportions set forth above was measured in different environments and the result are shown in Table 2 below.

TABLE 2

| conditions | resistance |
| --- | --- |
| High temp. high humidity (35.0° C. & 95% RH) | $1.3 \times 10^6$ Ω (at 1500 V) |
| Ordinary temp. ordinary humidity (23.5° C. & 55% RH) | $0.9 \times 10^6$ Ω (at 1500 V) |
| Low temp. low humidity (10.0° C. & 15% RH) | $1.4 \times 10^6$ Ω (at 1500 V) |

It is seen from the data in this TABLE 2 that the silicone rubber roller for electrophotography according to this preferred embodiment of the present invention exhibits small changes in electric resistance as a consequence of environmental changes.

Referring now to FIG. 1, there is shown the relation between voltage impressed on and current passing through the silicone rubber roller for electrophotography according to the invention under conditions of:

high temperature and high humidity (32.5° C. & 90% RH), ordinary temperature and ordinary humidity (23.5° C. & 55%. RH), and low temperature and low humidity (10.0° C. & 15% RH) environments. It is seen that changes in impressed voltage and current characteristics due to environmental changes are very small.

An electrically conductive rubber roller for electrophotography according to this embodiment of the invention is formed by adding a silica type filler, carbon black, preferably a foaming agent, suitable conventional additives, a vulcanizing agent, and the like to raw siloxane rubber polymer to form a composition; subjecting the composition to forming, such as injection molding, press forming, extrusion molding, and the like, into the shape of a roller; crosslinking the rubber while in the roller shape; and then subjecting the crosslinked roller to vacuum heating as aforesaid, thus producing a roller for electrophotography which has substantially no bleed out, even after 18 days of storage, and has very stable resistivity, even under varying temperature and humidity conditions.

Although the use of raw siloxane polymer rubber alone produces a roller which has excellent protection against bleed out when the roller is made according to this invention, rollers made from polysiloxanes alone do not provide the characteristics required of an electrically conductive rubber roller for electrophotography which has exceptionally stable resistivity. For this reason, in this embodiment of this invention, a silica type filler is added in addition to the conductive carbon black and the other additives. Such silica type fillers are exemplified by hydrated silica, anhydrous silica and salts thereof. Other silicas are also suited to this use. If the silica is added in an amount of about 18–28 parts by weight per 100 parts by weight of siloxane polymer, a composition having a low hardness of not more than 35° (Asker C) is produced. If the hardness exceeds 35°, the pressure of contact with the photoreceptor increases but the contact area decreases, and print failure can then take place, so that the images are not stabilized (stabilized image transfer cannot be attained).

Further, this embodiment of the present invention also adds carbon black to the rubber composition in order to impart electric conductivity thereto. The carbon blacks which are useful in this embodiment of this invention are exemplified by furnace blacks, such as FEF and GPF, acetylene black, and ketjen black. And if the additive amount of carbon black is selected so that it is about 5–12% based on the weight of the raw siloxane polymer rubber, a composition having an electric resistance of about $10^3$–$10^8$ Ω can be obtained.

TABLE 2 below shows the results of experiments in printing using rollers made according to this invention in a laser beam printer (LB-A404 produced by Canon Inc.). In the reported following Experiments 1–5, varying amounts of carbon black and silica were used whereby the rollers which were made had varying conductivities (resistivities) and varying hardnesses.

TABLE 3

| | Embodiment 1 Silicone sponge | Embodiment 2 Silicone sponge | Embodiment 3 Silicone sponge | Embodiment 4 Silicone sponge | Embodiment 5 Silicone sponge |
| --- | --- | --- | --- | --- | --- |
| Electric resistance Ω | $5 \times 10^2$ | $5 \times 10^3$ | $5 \times 10^5$ | $5 \times 10^8$ | $5 \times 10^9$ |
| Hardness | Asker C. 25° | Asker C. 26° | Asker C. 25° | Asker C. 27° | Asker C. 28° |

TABLE 3-continued

|  | Embodiment 1 Silicone sponge | Embodiment 2 Silicone sponge | Embodiment 3 Silicone sponge | Embodiment 4 Silicone sponge | Embodiment 5 Silicone sponge |
| --- | --- | --- | --- | --- | --- |
| Image evaluation |  |  |  |  |  |
| High temp. high humidity | X | Δ | ○ | Δ | X |
| Ordinary temp. ordinary humidity | Δ | ○ | ○ | ○ | X |
| Low temp. low humidity | ○ | ○ | ○ | ○ | ○ |

Criteria of evaluation
○: Characters and charts are distinct, with no unevenness in solid portion.
Δ: Characters and charts are distinct, with little unevenness in solid portion and with blurs.
X: Characters and charts are distinct, with much unevenness in solid portion and with blurs.
High temperature and high humidity (32.5° C. & 90% RH)
Ordinary temperature and ordinary humidity (23.5° C. & 55% RH)
Low temperature and low humidity (10.0° C. & 15% RH)

The above results show that faults in image quality, such as poor settlement and unevenness in the solid portion, occur in the case of the roller in Experiment 1 under conditions of high temperature and high humidity; and in the case of the roller in Experiment 5 in the case of high temperature and high humidity, as well as ordinary temperature and ordinary humidity environments. However, the rollers of Experiments 2 through 4 have been formulated according to this preferred embodiment of this invention so as to stabilize their resistivity, whereby changes in electric resistance are small regardless of the temperature and humidity conditions, so that satisfactory image quality is obtained in any of the tested environments.

Reference is now made to FIG. 2 which shows the time-dependent changes in the electric resistance, hardness, width and outer diameter of the roller in Experiment 3. It is seen that a stabilized electric resistance and hardness can be obtained despite time dependent changes which occur in other characteristics.

SPECIFIC EXAMPLES OF THIS INVENTION

EXAMPLE 1

60 parts by weight of an electrically conductive silicone rubber type compound (Product No. X-30-1807U produced by The Shin-Etsu Chemical Co., Ltd.) in which the sum of the concentrations of remnant siloxanes (low molecular weight, low polymerization degree polysiloxanes, cyclic siloxanes, and non-functional silicone oils) had been adjusted to not more than 5,000 ppm, and 40 parts by weight of an electrically insulating silicone compound (Product No. X-30-1807M produced by The Shin-Etsu Chemical Co., Ltd.) in which the sum of the concentrations of the remnant siloxane components had been likewise adjusted to not more than 5,000 ppm, were mixed with the following additives, melted, and kneaded by a roll mill, thereby preparing a millable rubber molding material composition.

| Additive | | Added amount |
| --- | --- | --- |
| Forming agent: | Product No. X-30-1847U produced y The Shin-Etsu Chemical Co., Ltd. | 5 phr |
| Cross linking agent: | Product No. X-30-1848U produced by The Shin-Etsu Chemical Co., Ltd. | 2.5 phr |
|  | Product No. X-30-1849U produced by The Shin-Etsu Chemical Co., Ltd. | 2.0 phr |
| Catalyst: | Product No. PL-2 produced by The Shin-Etsu Chemical Co., Ltd | 0.03 phr |
| Catalytic control agent: | Product No. X-30-253 produced by The Shin-Etsu Chemical Co., Ltd. | 0.03 phr |

Then, said molding material was extrusion-molded into a roller form and primarily crosslinked by an HAV method at 200° C. for 30 minutes, thereby forming a primary crosslinked roller. This roller was secondarily crosslinked and simultaneously heated under a vacuum using a vacuum oven (Model DP61, a vacuum constant temperature dryer, produced by Yamato Science Co., Ltd.) at an ultimate vacuum of 2 mm Hg, and a furnace wall temperature of 240° C. for 6 hours, thereby producing a silicone rubber roller for electrophotography according to this invention which has substantially no remnant siloxanes therein.

EXPERIMENTS 2–6

Rollers made of the same molding material composition as used in EXPERIMENT 1 which had been primarily crosslinked and molded into the form of a roller under the same conditions as in EXPERIMENT 1 were secondarily crosslinked using an atmospheric pressure, constant temperature dryer (Model DNF64 produced by Yamato Science Co., Ltd.) by an HAV method at 200° C. for 4 hours. This crosslinked roller was then heated under a vacuum, using the same vacuum oven as described above, under the conditions shown in the following Table 4, thereby producing silicone rubber rollers for electrophotography.

TABLE 4

|  | Vacuum heating conditions | | |
| --- | --- | --- | --- |
|  | Vacuum (mm Hg) | Temperature (T° C.) | Time (hr) |
| EXPERIMENT 2 | 2 | 240 | 24 |
| EXPERIMENT 3 | 2 | 240 | 6 |
| EXPERIMENT 4 | 2 | 240 | 4 |
| EXPERIMENT 5 | 2 | 200 | 6 |
| EXPERIMENT 6 | 2 | 200 | 4 |

COMPARISON EXAMPLE 1

60 parts by weight of an electrically conductive silicone rubber type compound (Product No. X-30-289U produced by The Shin-Etsu Chemical Co., Ltd.) in which the sum of the concentrations of remnant siloxanes (low polymerization degree polysiloxanes, cyclic siloxanes, and non-functional silicone oils) had not been adjusted to not more than 5,000 ppm and 40 parts by weight of an electrically insulating silicone compound (Product No. KE-1551U produced by The Shin-Etsu Chemical Co., Ltd.) in which the concentration of the remnant siloxanes had not been adjusted to not more than 5,000 ppm, were mixed with the following additives, melted and kneaded by a roll mill, thereby preparing a millable raw rubber molding material composition.

| | Additive | Added amount |
|---|---|---|
| Forming agent: | Product No. KEP-13 produced by The Shin-Etsu Chemical Co., Ltd. | 5 phr |
| Crosslinking agent | 50% azo bis isobutyronitrile 50% silicone paste (Product No. C-3M produced by The Shin-Etsu Chemical Co., Ltd.) | 2.5 phr |
| | 20% dicumyl peroxide 80% silicone paste (Product No. HC-101 produced by The Shin-Etsu Chemical Co., Ltd.) | 2.0 |
| Catalyst | platinum (Product No. PL-2 produced by The Shin-Etsu Chemical Co., Ltd.) | 0.03 phr |
| Catalytic control agent: | Product No. X-30-253 produced by The Shin-Etsu Chemical Co., Ltd. | 0.03 phr |

The raw rubber molding composition was molded and then primarily crosslinked under the same conditions as in EXAMPLE 1 to produce a roller, which was then secondarily crosslinked using an atmospheric pressure, constant temperature dryer (Model DNF64 produced by Yamato Science Co., Ltd.) by an HAV method at 200° C. for 4 hours, thereby producing a crosslinked silicone rubber roller for electrophotography.

COMPARISON EXAMPLE 2

A silicone rubber roller for electrophotography was produced in the same manner as in EXAMPLE 1 except that the same molding material as in COMPARISON EXAMPLE 1 was used.

COMPARISON EXAMPLE 3

A silicone rubber roller for electrophotography was produced in the same manner as in COMPARISON EXAMPLE 1 except that the same molding material as in EXAMPLE 1 was used.

COMPARISON EXAMPLE 4

A silicone rubber roller for electrophotography was produced in the same manner as in COMPARISON EXAMPLE 3 except that the secondary crosslinking was effected at 250° C. for 4 hours.

COMPARISON EXAMPLE 5

A roller made of the same molding material as in EXAMPLE 1 which had been molded and then primarily crosslinked under the same conditions as in EXAMPLE 1, but was not secondarily crosslinked nor heated under a vacuum, was extracted with trichloroethane heated to 80° C. for 10 minutes, thereby producing a silicone rubber roller for electrophotography which had not been subjected to vacuum heating.

COMPARISON EXAMPLES 6–10

Rollers made of the same molding material as in EXAMPLE 1 and primarily crosslinked and molded under the same conditions as in EXAMPLE 1 were immersed in the solvents shown in Table 5, below, for 76 hours as an extraction treatment. Silicone rubber rollers for electrophotography were thereby produced without them being subjected to vacuum heating

TABLE 5

| | Solvent |
|---|---|
| COMPARISON EXAMPLE 6 | Acetone |
| COMPARISON EXAMPLE 7 | Hexane |
| COMPARISON EXAMPLE 8 | Ethyl acetate |
| COMPARISON EXAMPLE 9 | Toluene |
| COMPARISON EXAMPLE 10 | Ethanol |

Each of the silicone rubber rollers for electrophotography produced in these EXAMPLES and COMPARISON EXAMPLES was pressed against the photoreceptor of a laser beam printer (Laser Shot Printer A404 produced by Canon Inc.) and was left for 72 hours at an environmental temperature of 23.5° C. and an environmental humidity of 55% RH, and then 5 solid test charts were continuously printed to examine the presence or absence of touch memory on the formed images. The photoreceptor contamination was evaluated on the basis of the following evaluation criteria.

0: Average brightness 0 to 62 (No touch memory)
Δ: Average brightness 63 to 68 (Slight touch memory)
X: Average brightness (Touch memory clearly seen) The results are shown in the following TABLE 6:

TABLE 6

| | Test Chart | | | | |
|---|---|---|---|---|---|
| | 1st | 2nd | 3rd | 4th | 5th |
| EXAMPLE 1 | Δ | 0 | 0 | 0 | 0 |
| EXAMPLE 2 | Δ | Δ | 0 | 0 | 0 |
| EXAMPLE 3 | 0 | 0 | 0 | 0 | 0 |
| EXAMPLE 4 | 0 | 0 | 0 | 0 | 0 |
| EXAMPLE 5 | Δ | 0 | 0 | 0 | 0 |
| EXAMPLE 6 | 0 | 0 | 0 | 0 | 0 |
| COMPARISON EXAMPLE 1 | X | X | X | Δ | Δ |
| COMPARISON EXAMPLE 2 | 0 | 0 | 0 | 0 | 0 |
| COMPARISON EXAMPLE 3 | X | X | Δ | 0 | 0 |
| COMPARISON EXAMPLE 4 | X | X | Δ | 0 | 0 |
| COMPARISON EXAMPLE 5 | X | X | Δ | 0 | 0 |
| COMPARISON EXAMPLE 6 | X | X | Δ | 0 | |
| COMPARISON EXAMPLE 7 | Δ | Δ | 0 | 0 | 0 |
| COMPARISON EXAMPLE 8 | X | X | X | Δ | Δ |
| COMPARISON EXAMPLE 9 | X | X | 0 | 0 | 0 |
| COMPARISON EXAMPLE 10 | X | X | Δ | 0 | 0 |

As can be seen in TABLE 6, the rollers in COMPARISON EXAMPLES 1, 3 and 4, in which the rollers were secondarily crosslinked but were not subjected to being vacuum-heated, and the rollers in COMPARISON EXAMPLES 6, 8, 9 and 10, in which the rollers were subjected only to solvent extraction but were not subjected to vacuum-heated, caused contamination of the respective photoreceptors irrespectively of the fact that the concentrations of the remnant siloxanes (the low molecular weight, low polymerization degree siloxanes, cyclic siloxanes, and non-functional silicone oils) in the silicone raw rubber were below the minimum level of 5,000 ppm.

It is to be noted that of the rollers of the COMPARISON EXAMPLES, in which only solvent extraction was effected without vacuum heating, the roller of COMPARISON EXAMPLE 7, which used hexane as the extracting solvent, did not cause much contamination of the photoreceptor. However, it is also to be noted that it took 76 hours for the extraction treatment to get the level of remnant siloxanes down to the desired level. The length of time that this extraction treatment took but was found to be unsuitable for practical use.

In contrast, the rollers in EXAMPLES 1–6, which were made from a molding material containing a raw silicone rubber type compound in which the concentration of the remnant siloxanes was not more than 5,000 ppm, and in which the roller, subsequent to its having been formed and crosslinked, was vacuum-heated, did not cause substantially any contamination of the photoreceptor irrespectively of the vacuum heating conditions and irrespective of whether the roller had been secondarily crosslinked at ordinary pressure before the vacuum heating step.

Figure 5:
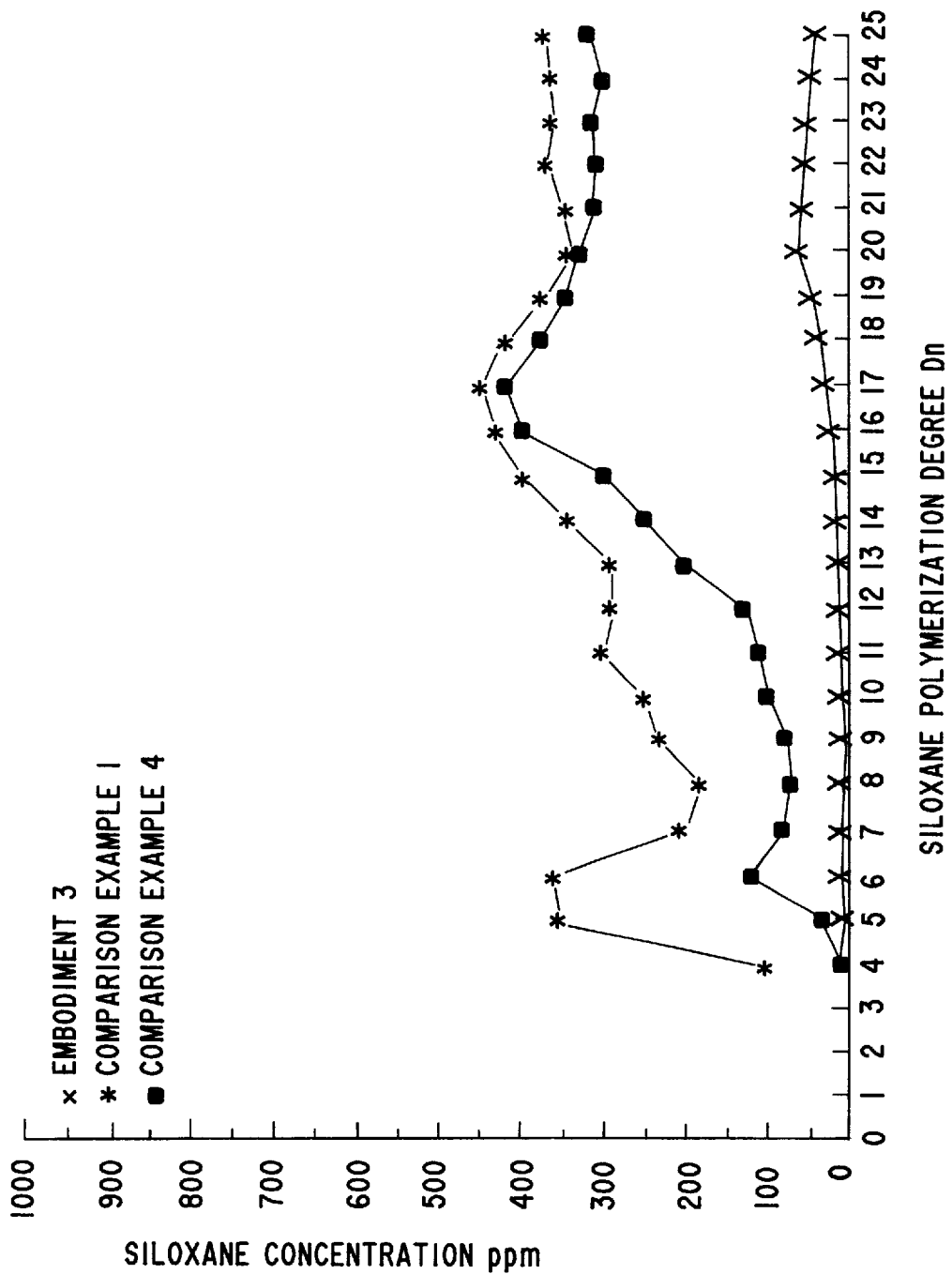
FIG. 5 is a graph showing the relation between the concentration of remnant siloxanes, including: low polymerization degree polysiloxanes having a polymerization degree of 4–25, cyclic siloxanes and non-functional silicone oils, and methods of treating rollers, both made according to this invention as well as according to comparison examples.

The concentration of the low polymerization degree siloxanes in the rollers in EXAMPLE 3 (vacuum heating), COMPARISON EXAMPLE 1 (atmospheric or ordinary pressure heating) and COMPARISON EXAMPLE 4 (solvent extraction) was measured and reported in FIG. 5. The concentration of the remnant siloxanes in the final roller of Example 3 was much lower than it was in the rollers of COMPARISON EXAMPLES 1 and 4. The quality of the products, as reported in TABLE 6 reflects these differences. From the above results, it is seen that the most effective way of preventing contamination of the photoreceptor is to vacuum-heat the crosslinked roller after molding.

The roller in COMPARISON EXAMPLE 2, which was made from a raw silicone rubber in which the proportion of remnant siloxanes was not less than 5000 ppm, but wherein the roller was vacuum-heated subsequent to its having been molded and crosslinked, did not cause contamination of the photoreceptor when it was used substantially immediately after its manufacture, similar to the rollers shown in EXAMPLES 1–6. However, when the roller of COMPARISON EXAMPLE 2 was stored for 18 days and then used in electrophotography, the photoreceptor was contaminated. These results should be compared to the results achieved in using the rollers of EXAMPLES 2, 3 and 4, which were also stored for 18 days and then used for electrophotography. The same tests were conducted on the rollers of COMPARISON EXAMPLE 2 and EXAMPLES 2, 3, and 4. It was found, as shown in the following TABLE 7 that although the rollers of EXAMPLES 2, 3 and 4 did not cause contamination of the photoreceptor, the roller of COMPARISON EXAMPLE 2 caused contamination of the photoreceptor.

TABLE 7

|  | Test Chart | | | | |
| --- | --- | --- | --- | --- | --- |
|  | 1st | 2nd | 3rd | 4th | 5th |
| EXAMPLE 2 | Δ | Δ | 0 | 0 | 0 |
| EXAMPLE 3 | 0 | 0 | 0 | 0 | 0 |
| EXAMPLE 4 | 0 | 0 | 0 | 0 | 0 |
| COMPARISON EXAMPLE 2 | X | Δ | Δ | 0 | 0 |

Figure 6:
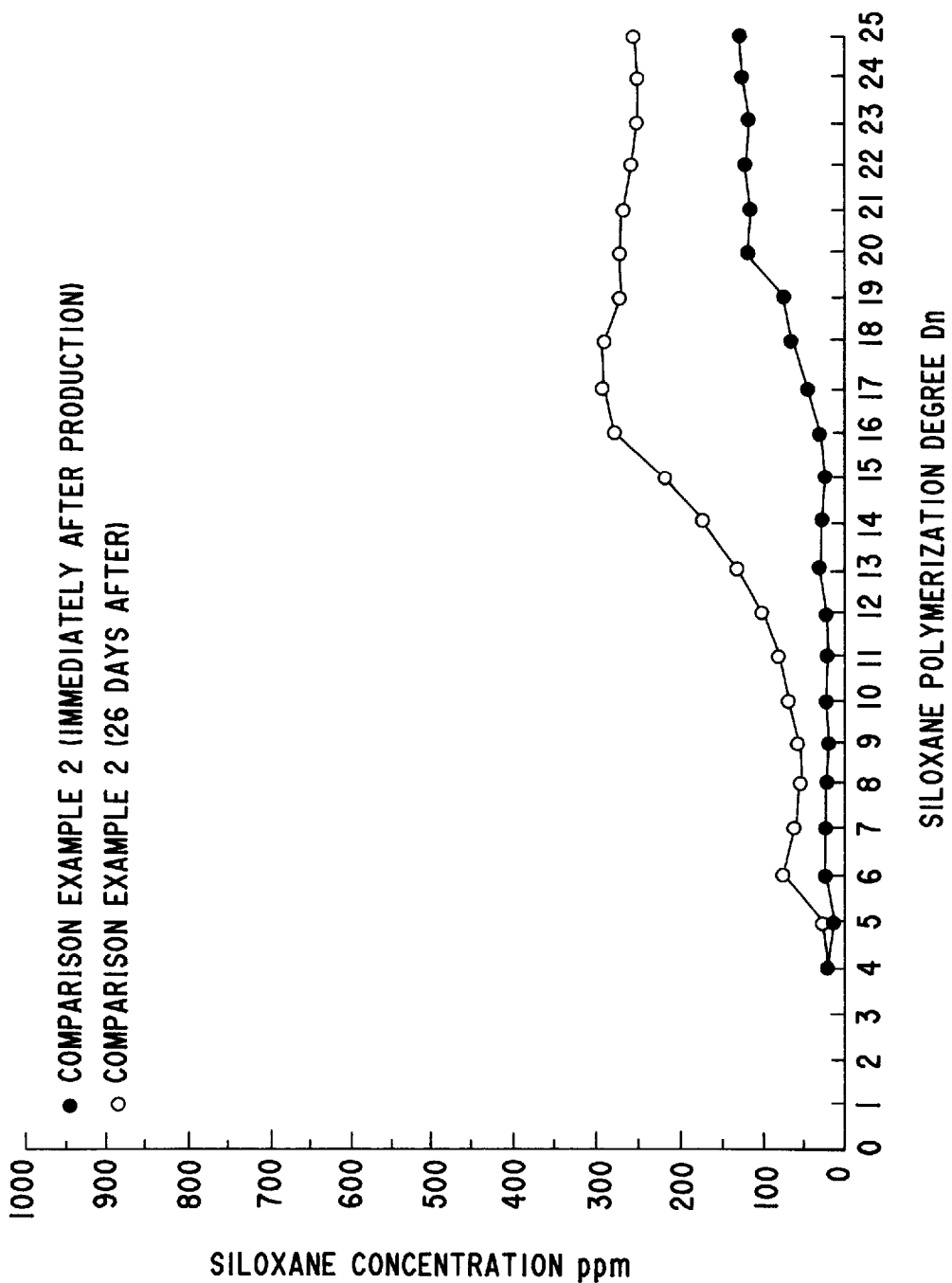
FIG. 6 is a graph showing time-dependent changes in the concentration of remnant siloxanes in rollers made according to Comparison Example 2.

The concentration of low polymerization degree siloxanes having a polymerization degree of 4–25 on the roller surface in said Comparison example 2 was measured by gas chromatography both immediately after production of the roller and 26 days thereafter. It was found that, as shown in FIG. 6, the concentration of remnant siloxanes on the surface of the rollers increased with the lapse of time.

From the above result, it has been ascertained that, where a raw silicone rubber type compound, which contained more than the permitted maximum 5,000 ppm of remnant siloxanes, was used, sufficient remnant siloxanes cannot later be completely removed from the crosslinked roller by vacuum heating alone. Under these circumstances, the remnant siloxanes remaining in the roller gradually bleed to the surface of the roller and then act to contaminate the photoreceptor. Thus, whatever removal effect was obtained by the subsequent heating under a vacuum, is lost with the passage of time if the original raw siloxane polymer initially had too much of these remnant siloxanes in it to begin with.

It has been ascertained that contamination of the photoreceptor can be prevented for a long time only if the roller is made from a molding material containing a silicone rubber type compound in which the proportion of the remnant siloxanes is maintained at not more than 5,000 ppm prior to molding and crosslinking, and if, after molding and at least primary crosslinking, the product roller is then subjected to heating under a vacuum.

EXAMPLES 7 and 8, and COMPARISON EXAMPLES 11 to 15

With the use of a molding material identical with that used in EXAMPLE 1, rollers were molded and primarily crosslinked under substantially the same conditions as those used in EXAMPLE 1. The rollers thus molded and primarily crosslinked were then secondarily crosslinked by being heated to 200° C. for 4 hours according to the HAV method, using an atmospheric pressure thermostatically controlled drier (DNF64 manufactured by Yamato Kagaku Co., Ltd.). The resulting fully crosslinked rubber roller was then heated under a vacuum, using a vacuum oven identical with that used in EXAMPLE 1, under the respective conditions shown in the following TABLE 8, thus producing a series of polysiloxane rubber rollers for electrophotography.

TABLE 8

|  | Degree of Vacuum (mmHg) | Temperature (°C.) | Time (hr) |
| --- | --- | --- | --- |
| Example 7 | 5 | 240 | 6 |
| Comparative Example 11 | 10 | 240 | 6 |
| Example 8 | 2 | 150 | 6 |
| Comparative Example 12 | 2 | 100 | 6 |
| Comparative Example 13 | 2 | 300 | 6 |
| Comparative Example 14 | 2 | 240 | 1 |
| Comparative Example 15 | 2 | 240 | 30 |

With the use of the silicone rubber rollers for electrophotography of EXAMPLES 7 and 8, and COMPARISON EXAMPLES 11 to 15, images were formed in a manner similar to the manner mentioned earlier and then checked for touch memories. Based on the evaluation standards mentioned earlier, the degree of contamination of the photoreceptor was evaluated for each roller. It should be noted that the roller of COMPARISON EXAMPLE 13 was deformed at the time it was subjected to being heated under a vacuum, so that the degree of contamination of the photoreceptor could not be evaluated.

The results are shown in the following TABLE 9.

TABLE 9

|  | Test Chart | | | | |
| --- | --- | --- | --- | --- | --- |
|  | First piece | Second piece | Third piece | Fourth piece | Fifth piece |
| Example 7 | Δ | 0 | 0 | 0 | 0 |
| Comparative | X | Δ | 0 | 0 | 0 |

TABLE 9-continued

| | Test Chart | | | | |
|---|---|---|---|---|---|
| | First piece | Second piece | Third piece | Fourth piece | Fifth piece |
| Example 11 | | | | | |
| Example 8 | Δ | Δ | O | O | O |
| Comparative Example 12 | X | Δ | Δ | O | O |
| Comparative Example 13 | — | — | — | — | — |
| Comparative Example 14 | Δ | Δ | Δ | O | O |
| Comparative Example 15 | Δ | Δ | Δ | O | O |

A comparison of the contamination caused by the rollers of EXAMPLE 7 and COMPARISON EXAMPLE 11, as reported in TABLE 9, and the contamination caused by the roller of EXAMPLE 3, as reported in TABLE 6, shows that the contamination of the photoreceptor with the use of each of the rollers of EXAMPLES 3 and 7, which were heat treated under an ultimate vacuum of 5, mmHg, was less than the contamination of the photoreceptor with the use of the roller of COMPARISON EXAMPLE 11, which was heat treated under a vacuum, but where the vacuum was only pulled to an end point of 10 mmHg. Thus, it was ascertained and proven that the ultimate degree of vacuum, during the heat treatment under vacuum, should not be greater than 5 mmHg. When the results of EXAMPLE 3 were compared with the results of EXAMPLE 7, the contamination of the photoreceptor by the use of the roller of EXAMPLE 3, which was heat treated under a vacuum of down to 2 mmHg, was less than the contamination of the photoreceptor which had been contacted with the roller of EXAMPLE 7, which had been treated under a vacuum of down to 5 mmHg. Thus, it was also ascertained that it was more desirable in the practice of this invention to pull the vacuum during the heat treatment of the crosslinked rubber roller to the greatest extent, that is the lower pressure (greater vacuum) was desirable, even though both vacuums were within the range suited to use in this invention.

A comparison of the rollers of EXAMPLE 8 and COMPARATIVE EXAMPLES 12 and 13, as shown in TABLE 9, along with a comparison of the rollers of EXAMPLES 3 and 5, as shown in TABLE 6, shows that the contamination of the photoreceptor caused by use of each of the rollers of EXAMPLES 3, 5, and 8, which were heat treated under the same vacuum at temperatures of not less than 150° C., was less than the contamination of the photoreceptor with the use of the roller of COMPARATIVE EXAMPLE 12, which was heat treated at a temperature of 100° C., and at the same ultimate vacuum. Thus, it was ascertained that the temperature of the heat treatment under a vacuum was preferably not less than 150° C., even under a very strong vacuum of 2 mmHg. The roller of COMPARISON EXAMPLE 13, which was heat treated under a vacuum at a temperature of 300° C., was deformed because the heat treating temperature was too high. Thus, it was ascertained that the temperature of the heat treatment under a vacuum was preferably not greater than 250° C. When comparison was made of the roller of EXAMPLES 3, 5, and 8, it was discovered that the higher the heat treating temperature was, provided the vacuum was strong enough, the less was the contamination of the photoreceptor. It was also ascertained that, within the operative range of heat treating temperatures, the higher heat treating temperatures were preferred.

A comparison of the rollers reported in COMPARISON EXAMPLES 14 and 15 with the rollers reported in EXAMPLES 3, 4, and 5 in Table 6, showed that the contamination of the photoreceptors occasioned by using the rollers reported in each of EXAMPLES 3, 4, and 5, which were heat treated under a vacuum at temperatures and pressures which were within the scope of this invention for periods of time of 3 to 25 hours, were less the contaminations of the photoreceptors which resulted from using the rollers of COMPARISON EXAMPLES 14 and 15, which rollers had been heat treated for 1 hour (too short) and 30 hours (too long), respectively. Thus, it was ascertained that the period of time of the heat treatment under a vacuum was preferable in the range from 3 to 25 hours.

EXAMPLE 9

The silicone rubber roller for electrophotography reported in EXAMPLE 2 was subjected to an extraction treatment, by being immersed in hexane, at ambient temperature for 3 hours. The crosslinked, heat treated under vacuum polysiloxane rubber roller thus extraction treated, was used to produce images in a manner similar to the manner mentioned earlier and then touch memories were determined. Based on the evaluation standards mentioned earlier, the degree of contamination of photoreceptor was evaluated for this roller. Together with the results obtained by using the roller of EXAMPLE 2, the results of using the roller of EXAMPLE 9 are shown in the following TABLE 10.

TABLE 10

| | First piece | Second piece | Third piece | Fourth piece | Fifth piece |
|---|---|---|---|---|---|
| Example 9 | O | O | O | O | O |
| Example 2 | Δ | Δ | O | O | O |

From the results shown in this TABLE 10, it was ascertained that the joint use of a heat treatment under a vacuum pursuant to this invention, together with a solvent extraction treatment, further reduced the contamination of the photoreceptor.

What is claimed is:

1. A method of producing a rubber roller for use in electrophotography comprising:
    forming a composition comprising a base polymer comprising a polysiloxane raw rubber containing not more than 5,000 ppm of remnant siloxanes, said remnant siloxanes consisting of:
        polysiloxanes having a polymerization degree of not more than 25;
        cyclic siloxanes; and
        non-functional silicone oils;
    crosslinking and molding said composition into the form of an intermediate roller; and
    then subjecting said intermediate roller to heating under a vacuum of not more than 5 mm Hg under such a combination of conditions as to produce a final roller which, after 18 days of storage, exhibits slight touch memory or no touch memory on a first copy sheet of paper and no touch memory at the latest on a third copy sheet of paper, and which is substantially free of said remnant siloxanes.

2. A method of forming a roller for use in electrophotography as claimed in claim 1, further comprising secondarily crosslinking said intermediate roller prior to heating said intermediate roller in a vacuum.

3. A method of forming a roller for use in electrophotography as claimed in claim 1, wherein said composition further comprises about 18 to 28 parts by weight of particulate silica and about 5 to 12 parts by weight of conductive carbon, respectively per 100 parts by weight of said polysiloxane raw rubber.

4. A method of forming a roller for use in electrophotography as claimed in claim 1, wherein said composition further comprises a foaming agent, and said method further comprises causing said composition to foam into a sponge form prior to said crosslinking.

5. A method of forming a roller for use in electrophotography as claimed in claim 1, further comprising, in addition, and subsequent to said heating under a vacuum, extracting said roller with at least one solvent for said remnant siloxanes to assist in reducing the content of said remnant siloxanes in said roller.

6. A method as recited in claim 1, wherein said roller, after 72 hours of storage without use, allows at the worst only slight touch memory of average brightness 63–68 on a first copy sheet of paper.

\* \* \* \* \*